US012686312B2

(12) United States Patent
Joyner

(10) Patent No.: US 12,686,312 B2
(45) Date of Patent: Jul. 21, 2026

(54) ERGONOMIC HEADREST ASSEMBLY

(71) Applicant: Stephanie Joyner, Middleburg, FL (US)

(72) Inventor: Stephanie Joyner, Middleburg, FL (US)

( * ) Notice: Subject to any disclaimer, the term of this patent is extended or adjusted under 35 U.S.C. 154(b) by 983 days.

(21) Appl. No.: 17/701,216

(22) Filed: Mar. 22, 2022

(65) Prior Publication Data

US 2023/0302981 A1     Sep. 28, 2023

(51) Int. Cl.
| | |
|---|---|
| *A61H 23/02* | (2006.01) |
| *A61H 1/00* | (2006.01) |
| *B60N 2/879* | (2018.01) |
| *B60N 2/885* | (2018.01) |
| *B60N 2/90* | (2018.01) |
| *B64D 11/06* | (2006.01) |

(52) U.S. Cl.
CPC ............ *B60N 2/885* (2018.02); *A61H 1/005* (2013.01); *B60N 2/879* (2018.02); *B60N 2/976* (2018.02); *B64D 11/0642* (2014.12); *A61H 2201/0207* (2013.01); *A61H 2201/0214* (2013.01); *A61H 2201/1604* (2013.01); *A61H 2203/0431* (2013.01)

(58) Field of Classification Search
CPC .... A61H 2201/1604; A61H 2203/0431; A61H 2205/04; B60N 2/885; B60N 2/976; B60N 2/879; B60N 2/882; B60N 2/2851; B60N 2/2872; B60N 2/806; B60N 2/80; A47C 7/383; A47C 7/42; A47C 7/425; A47C 7/38; A47C 7/46; A47C 7/462; A47C 7/0213; A47C 16/00; A47C 31/126
See application file for complete search history.

(56) References Cited

U.S. PATENT DOCUMENTS

| | | | | |
|---|---|---|---|---|
| 1,597,355 A | * | 8/1926 | Fussell ................... | A47C 7/383 |
| | | | | 297/399 |
| 2,464,435 A | * | 3/1949 | Conradt ................. | B60N 2/882 |
| | | | | 297/397 |
| 2,613,731 A | * | 10/1952 | Roginski ............... | B60N 2/882 |
| | | | | 5/640 |
| 2,827,110 A | * | 3/1958 | Rising ................... | B60N 2/882 |
| | | | | 297/410 |
| 4,597,386 A | * | 7/1986 | Goldstein ................ | A61F 5/01 |
| | | | | 5/643 |
| 4,679,848 A | * | 7/1987 | Spierings ............... | A47C 7/425 |
| | | | | 297/284.3 |

(Continued)

*Primary Examiner* — Timothy A Stanis
*Assistant Examiner* — Christopher E Miller
(74) *Attorney, Agent, or Firm* — Lawrence J. Gibney

(57) ABSTRACT

An ergonomic headrest assembly which can be used by a user such as a passenger on an airplane or other vehicle to prevent or restrict side-to-side head movements of the user to enhance comfort of the user may include a lower portion. A headrest portion may be provided on the lower portion. The headrest portion may include a middle headrest section. A pair of side headrest sections may extend from the middle headrest section. The side headrest sections may be adjustable at selected angles with respect to the middle headrest section to support and prevent or restrict side-to-side movement of the head of a user as the middle headrest section of the headrest portion supports the user's head.

9 Claims, 7 Drawing Sheets

(56)                References Cited

U.S. PATENT DOCUMENTS

| | | | | |
|---|---|---|---|---|
| 4,987,625 | A * | 1/1991 | Edelson | A47C 20/026 |
| | | | | D12/128 |
| 5,374,238 | A * | 12/1994 | Xiao | A61H 23/0218 |
| | | | | 601/56 |
| 6,050,265 | A * | 4/2000 | Richardson | A61G 7/065 |
| | | | | 5/636 |
| 6,250,716 | B1 * | 6/2001 | Clough | A47C 7/383 |
| | | | | 297/391 |
| 6,299,248 | B1 * | 10/2001 | Gennaro | A47C 7/425 |
| | | | | 297/229 |
| 6,467,846 | B2 * | 10/2002 | Clough | B60N 2/885 |
| | | | | 297/391 |
| 6,648,416 | B2 * | 11/2003 | O'Connor | B60N 2/868 |
| | | | | 5/636 |
| 7,020,918 | B1 * | 4/2006 | Tinsley | A61G 13/009 |
| | | | | 5/652 |
| 7,779,492 | B2 * | 8/2010 | Mangano | A47G 9/1045 |
| | | | | 5/419 |
| 8,911,020 | B2 | 12/2014 | Westerink | |
| 9,028,000 | B2 * | 5/2015 | Millan | B60N 2/24 |
| | | | | 297/391 |
| 9,713,566 | B2 * | 7/2017 | Lavigne | A61H 23/02 |
| 9,833,025 | B2 | 12/2017 | Knapp | |
| D808,686 | S | 1/2018 | May | |
| 9,888,793 | B2 | 2/2018 | Walker | |
| 10,232,753 | B2 | 3/2019 | Aviles-Galberth | |
| 10,843,608 | B2 * | 11/2020 | Carlson | B60N 2/885 |
| 11,634,053 | B2 * | 4/2023 | Ilker | B60N 2/02246 |
| | | | | 297/410 |
| 2001/0054837 | A1 * | 12/2001 | O'Connor | B60N 2/2872 |
| | | | | 297/397 |
| 2009/0204034 | A1 * | 8/2009 | May | A61H 23/0245 |
| | | | | 601/46 |
| 2010/0223731 | A1 * | 9/2010 | Chang | A47C 7/383 |
| | | | | 5/657 |
| 2018/0334061 | A1 * | 11/2018 | Fredriksson | B60N 2/865 |
| 2019/0343307 | A1 | 11/2019 | Cullins | |
| 2020/0054517 | A1 * | 2/2020 | Hunt | A61H 39/04 |
| 2020/0337479 | A1 * | 10/2020 | Zurek | A47G 9/10 |
| 2021/0378910 | A1 * | 12/2021 | Saint Surin | B60N 2/976 |
| 2022/0031559 | A1 * | 2/2022 | Lee | B60N 2/0023 |
| 2023/0201073 | A1 * | 6/2023 | Li | A61H 23/0254 |
| | | | | 601/57 |

* cited by examiner

ERGONOMIC HEADREST ASSEMBLY

CROSS REFERENCES TO RELATED APPLICATIONS

This application is a non-provisional application that claims priority from an earlier filed provisional application with a filing date of Apr. 12, 2021 and associated serial number of 63/173,778.

FIELD OF THE INVENTION

The present invention relates generally to pillows, and more particularly, to an ergonomic headrest or pillow assembly which can be used by a user such as a passenger on an airplane or other vehicle and prevents or restricts side-to-side head movements of the user to enhance the comfort of the user.

BACKGROUND OF THE INVENTION

Pillows are ubiquitous in the lives of people around the world, Pillows are used to provide support to the head of a user as the user sleeps in a bed or chair or on a couch. Some pillows, such as throw pillows, have a display-only purpose and are made to serve as a decoration for a bed, couch or other item of furniture.

A typical conventional pillow may include an outer pillowcase of cotton, polyester, canvas, burlap, silk or other fabric with an interior filler made of feathers, foam, synthetic material or the like. Various colored patterns and/or lettering may be provided on the exterior of the pillowcase to enhance the aesthetic appearance of a room in which they are displayed. For example, throw pillows may be decorated in the colors and with the names and emblems of college or professional sports teams. Pillows which support the head of the user during sleep May include a pillow cover which slides over the pillowcase of the pillow. The pillow cover is changeable and can be periodically removed from the pillowcase for washing. A pillow cover may be a solid color or multiple colors, or may be decorated with a sports, holiday or other theme or pattern.

Pillows can have different thicknesses and compositions to achieve the desired support for the head and neck of the user. Most pillows, however, have the same basic shape and design. Some pillows may be made in a smaller size to facilitate packing and transport of the pillows.

Conventional pillows typically support the head and neck of the user in a single dimension which corresponds to the height of the head above the surface of the bed. As the head of the user rests on the pillow, the pillow may crease to accommodate the head. The height of the pillow typically cannot be adjusted to achieve the optimum fit for maximum comfort of the user. Moreover, the sides of the pillow may restrict side-to-side movement of the head only to a limited degree.

Passenger vehicles such as airplanes, buses, trains and the like typically include passenger seats in which passengers can sit and sleep during travel. A typical passenger seat on such a vehicle may include a cushioned seat portion, a cushioned backrest portion which extends from the seat portion and a cushioned headrest portion which extends from the backrest portion. The backrest portion may be reclinable to enable the seated passenger to lean back for enhanced comfort, particularly for napping or sleeping. While the headrest portion of the passenger seat prevents rearward movement of the passenger's head, the passenger's head may still have a tendency to move in side-to-side movements and potentially disrupt the sleep or comfort of the user.

Travel pillows are commonly used by passengers while traveling in automobiles, planes, buses, trains and the like. Travel pillows may be filled with memory foam, polystyrene bead, air, feather, stuffing or other filler material. Travel pillows may generally be C-shaped, O-shaped or L shaped. However, conventional travel pillows may have certain drawbacks. For example, the U-shaped travel pillows may not have the capability to support the head of the user below the chin. This limitation may cause the chin of the user to fall forward and the neck to lie at an awkward angle. Moreover, travel pillows may not have the capability to prevent or restrict side-to-side movement of the user's head during use.

Accordingly, there is need for a headrest solution which can be used by a user such as a passenger on an airplane or other vehicle and prevents or restricts side-to-side head movements of the user to enhance the comfort of the user.

SUMMARY OF THE INVENTION

The present invention is directed to an ergonomic headrest or pillow assembly, hereinafter referred to generally as ergonomic headrest assembly, which can be used by a user such as a passenger on an airplane or other vehicle to prevent or restrict side-to-side head movements of the user to enhance the comfort of the user. The ergonomic headrest assembly may include a lower portion. A headrest portion may be provided above the lower portion. The headrest portion may include a middle headrest section. A pair of side headrest sections may extend from the middle headrest section. The side headrest sections may be adjustable at selected angles with respect to the middle headrest section to support and prevent or restrict side-to-side movement of the head of a user as the middle headrest section of the headrest portion supports the user's head.

In an illustrative implementation of the invention, an ergonomic headrest assembly which can be used by a user such as a passenger on an airplane or other vehicle to prevent or restrict side-to-side head movements of the user to enhance the comfort of the user may include a lower portion. A headrest portion may extend and be adjoined to the lower portion. An assembly securing mechanism may be configured to attach the headrest portion of the ergonomic headrest assembly to the backrest portion of a passenger seat on an automobile, plane, bus, train or the like. The headrest portion of the ergonomic headrest assembly May include a middle headrest section. A pair of side headrest sections may extend from the middle headrest section. The side headrest sections may be adjustable at selected angles with respect to the middle headrest section to support and prevent or restrict side-to-side movement of the head of a user as the middle headrest section supports the user's head.

In a second aspect, the lower portion may include a bottom end and a top end, and the headrest portion may be supported by the top end of the lower portion.

In another aspect, a relatively wider, head portion May terminate the top end of the lower portion, and the headrest portion may be attached to the head portion.

In another aspect, the lower portion may be rollable to facilitate space-efficient storage of the ergonomic headrest assembly.

In another aspect, the lower portion may include a plurality of discrete bodies, and may further include a joint between adjacent discrete bodies.

In another aspect, the middle headrest section may be supported by the head portion of the lower portion.

In another aspect, the middle headrest section of the headrest portion may include a middle backing panel 22 and a middle headrest cushion on the middle backing panel.

In another aspect, at least one headrest section hinge May pivotally connect each side headrest section to the middle backing panel of the middle headrest section.

In some embodiments, each side headrest section of the headrest portion may include a side backing panel and a side headrest cushion on the side backing panel.

In another aspect, the middle headrest section and each of the side headrest sections may be generally rectangular (or Square).

In another aspect, the middle backing panel of the middle headrest section may have a pair of side middle panel edges, and each side headrest section of the headrest portion may be pivotally attached to each corresponding side middle panel edge of the middle backing panel.

In another aspect, the middle backing panel of the middle panel section may have a lower middle panel edge and an upper middle panel edge extending between the side middle panel edges.

In another aspect, the lower middle panel edge of the middle backing panel of the middle headrest section may be attached to the head portion of the lower portion.

In another aspect, the side backing panel of each side headrest section may include an inner side panel edge and an outer side panel edge, and the inner side panel edge may be pivotally attached to a corresponding one of the side middle panel edges of the middle backing panel of the middle headrest section.

In another aspect, the side backing panel of each side headrest section may include a lower side panel edge and an upper side panel edge extending between the inner side panel edge and the outer side panel edge.

In another aspect, the assembly securing mechanism May include at least one first attachment strip on the headrest portion and at least one second attachment strip on the backrest portion of the passenger seat and configured to engage the at least one first attachment strip.

In another aspect, at least one massage device may be disposed in the headrest portion and/or the lower portion to impart massage movements to the headrest portion and/or the lower portion.

In another aspect, at least one heating coil may be disposed in the headrest portion and/or the lower portion to heat the headrest portion and/or the lower portion.

In another aspect, at least one cooling element may be disposed in the headrest portion and/or the lower portion to cool the headrest portion and/or the lower portion.

In another aspect, at least one power source may electrically interface with the massage device, the at least one heating coil, and/or the at least one cooling element.

In another aspect, the at least one power source may include a power cord configured to connection to an external power source.

In another aspect, the power cord may be configured to be folded into a compact storage configuration for storage in the lower portion when not in use.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

NUMBERING REFERENCES

100 A Headrest Assembly
102 A Lower Portion
104 A Bottom End
106 A Top End
110 A Head Portion
112 A Joint
114 Discrete Bodies
118 A Headrest Portion
120 A Middle Headrest Section
122 A Middle Backing Panel
124 A Lower Middle Panel Edge
126 A Upper Middle Panel Edge
128 A Pair of Side Middle Panel Edges
130 A Front Panel Surface
132 A Rear Panel Surface
136 A Middle Headrest Cushion
140 A Pair of Side Headrest Sections
142 A Side Backing Panel
144 A Lower side Panel Edge
146 An Upper Side Panel Edge
148 An Inner Side Panel Edge
150 An Outer Side Panel Edge
152 A Side Headrest Cushion
154 A Front Side Panel Surface
156 A Rear Side Panel Surface
160 A Headrest Section Hinge
164 An Assembly Securing Mechanism 166 A First Attachment Strip
168 A Second Attachment Strip
170 A Massager Motor
172 A Heating Coil
174 A PCB (Printed Circuit Board)
176 A Power Source
178 A Power Cord
180 A Passenger Seat
182 A Massage Device
184 A Backrest Portion
188 An External Electrical Outlet
190 A User
192 A Head

DETAILED DESCRIPTION OF THE EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward an ergonomic headrest assembly which can be used by a user such as a passenger on an airplane or other vehicle and prevents or restricts side-to-side head movements of the user to enhance comfort of the user.

Figure 1:
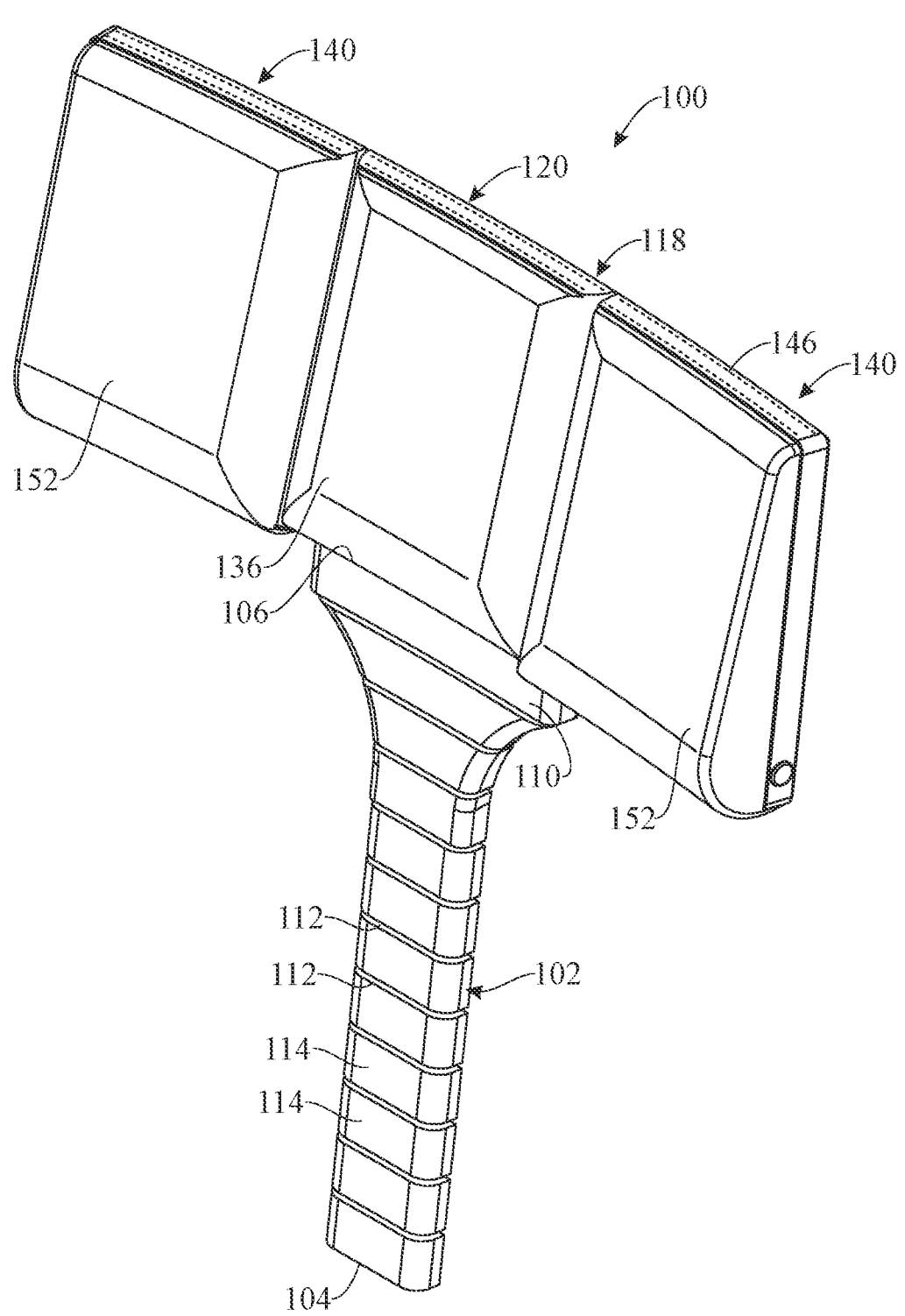
FIG. 1 presents a front perspective view of an ergonomic headrest assembly in accordance with an illustrative embodiment of the present invention, with the side headrest sections deployed in a substantially straight or coplanar position with respect to the middle headrest section of the headrest portion.
Figure 2:
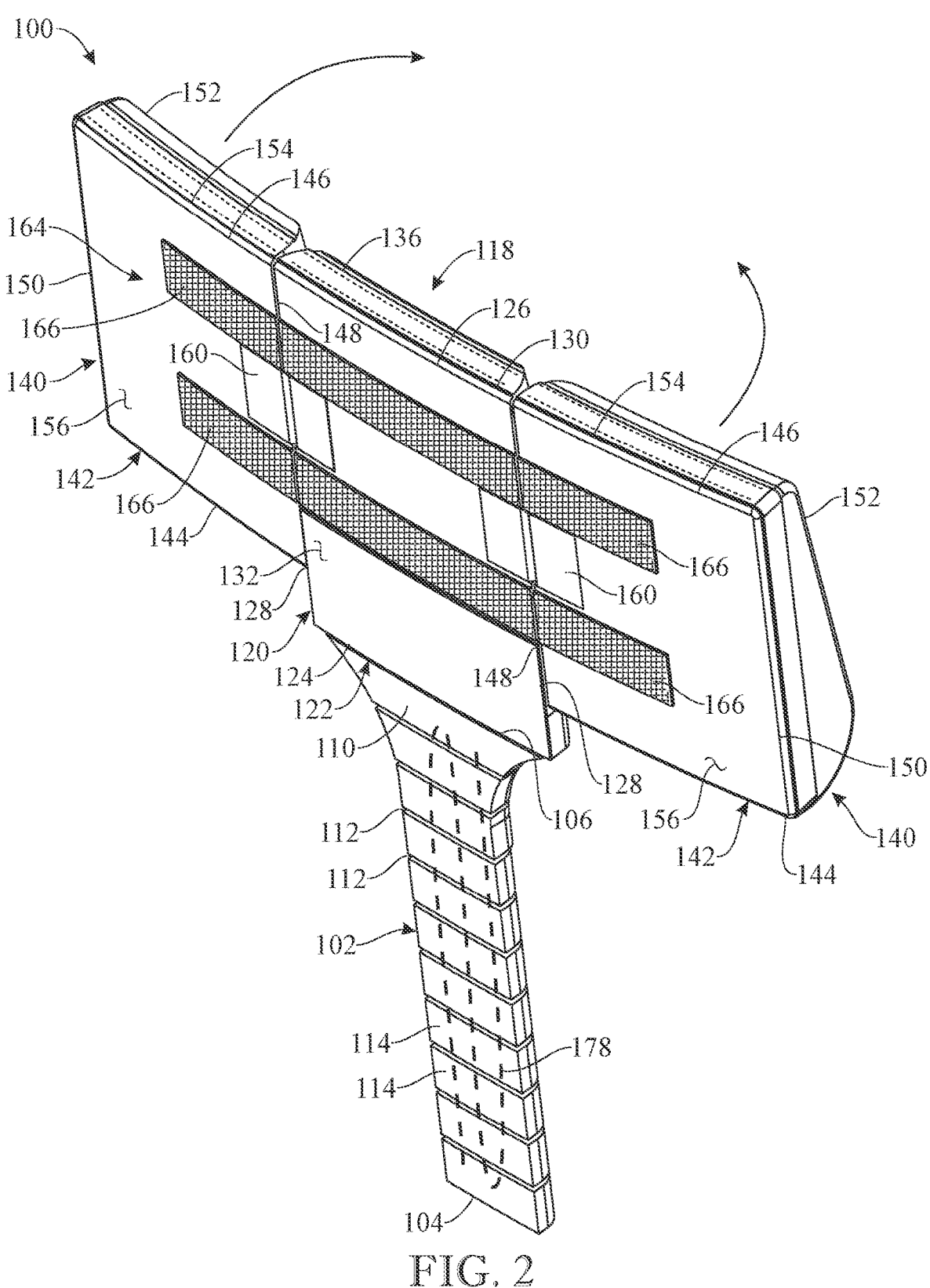
FIG. 2 presents a rear perspective view of the ergonomic headrest assembly illustrated in FIG. 1.
Figure 3:
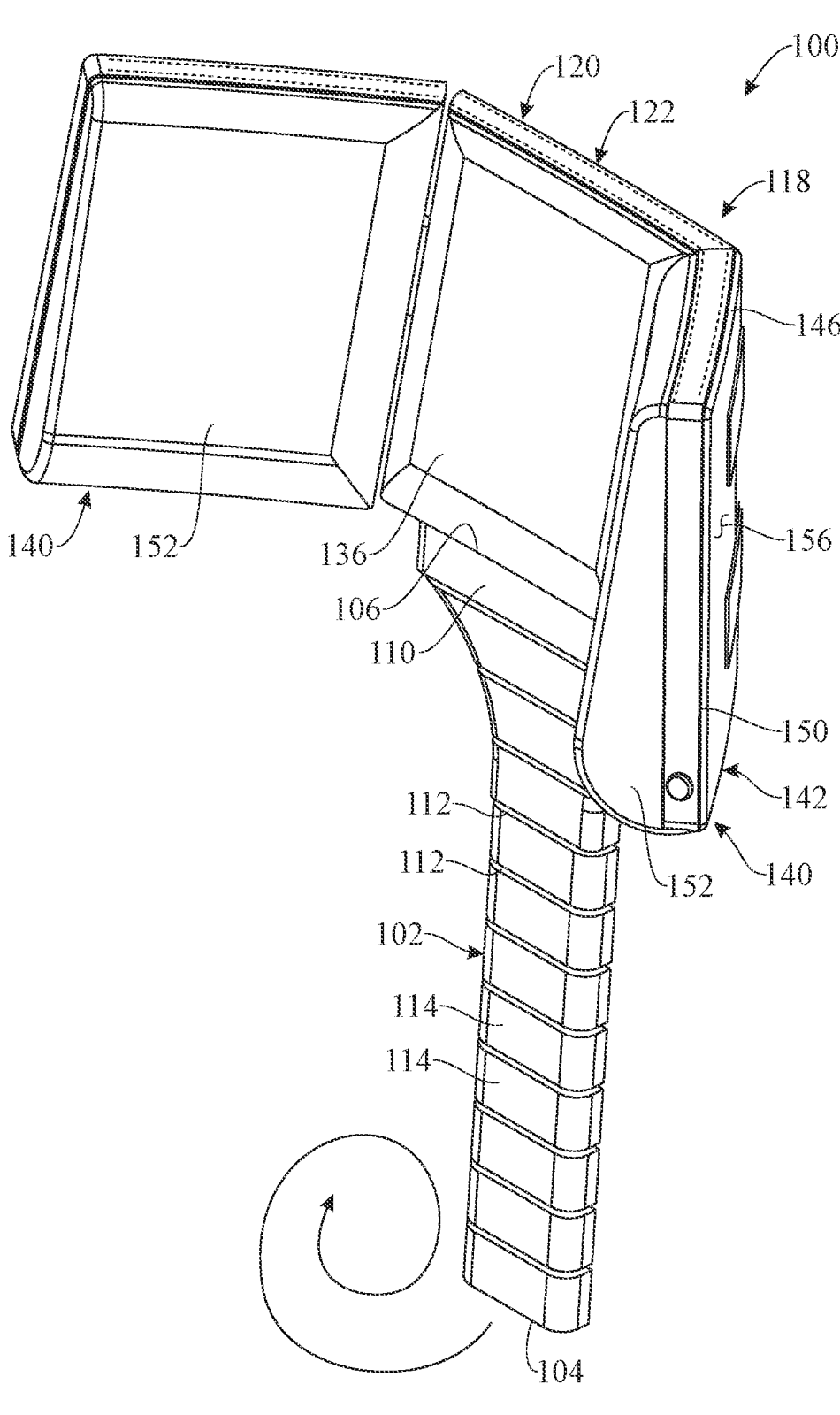
FIG. 3 presents a front perspective view of the ergonomic headrest assembly, with the side headrest sections deployed in an angled position with respect to the middle headrest section of the headrest portion.
Figure 4:
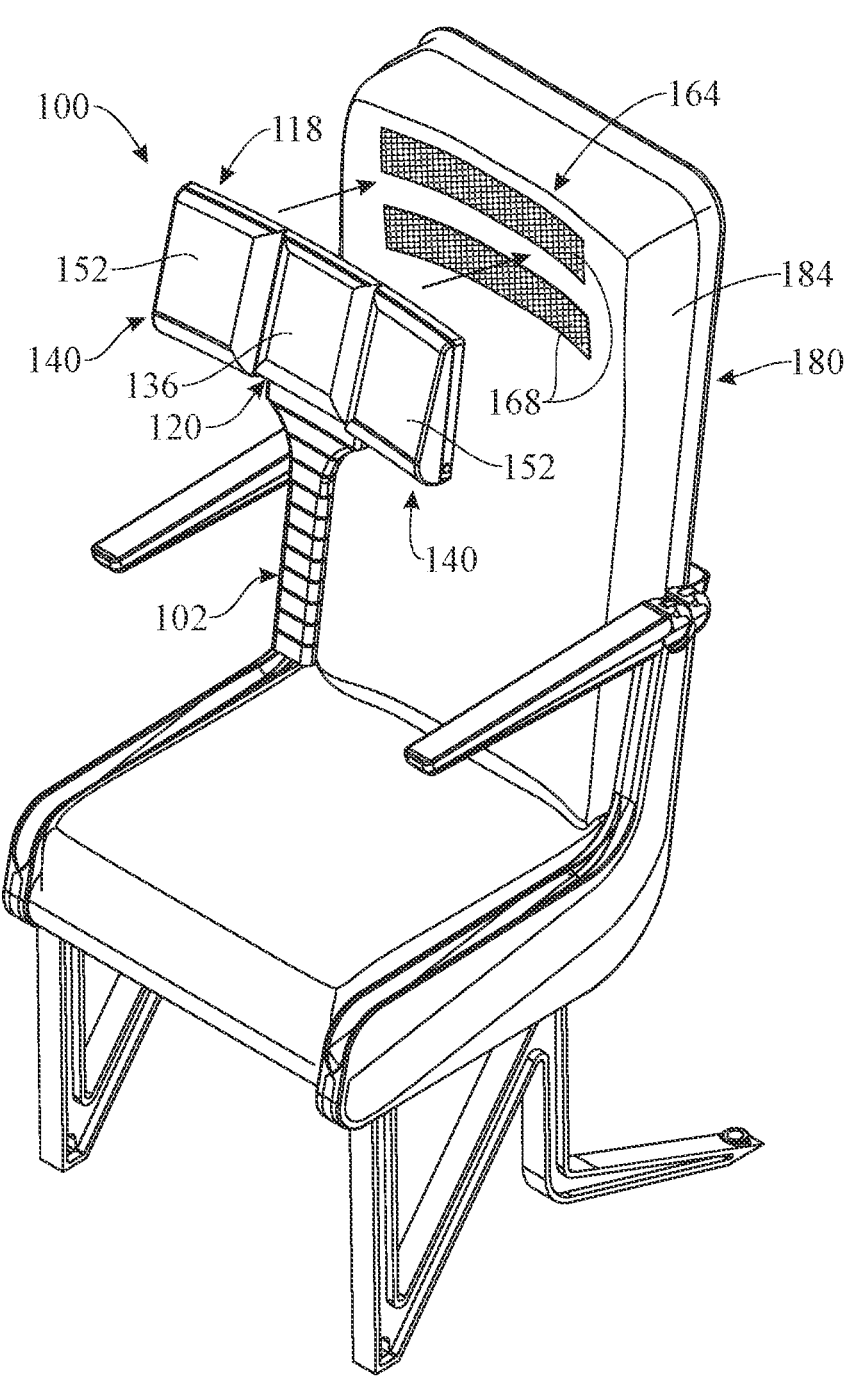
FIG. 4 presents a front perspective view of the ergonomic headrest assembly, more particularly illustrating a typical assembly securing mechanism suitable for securing the assembly to the backrest portion of a passenger seat in typical application of the assembly.
Figure 5:
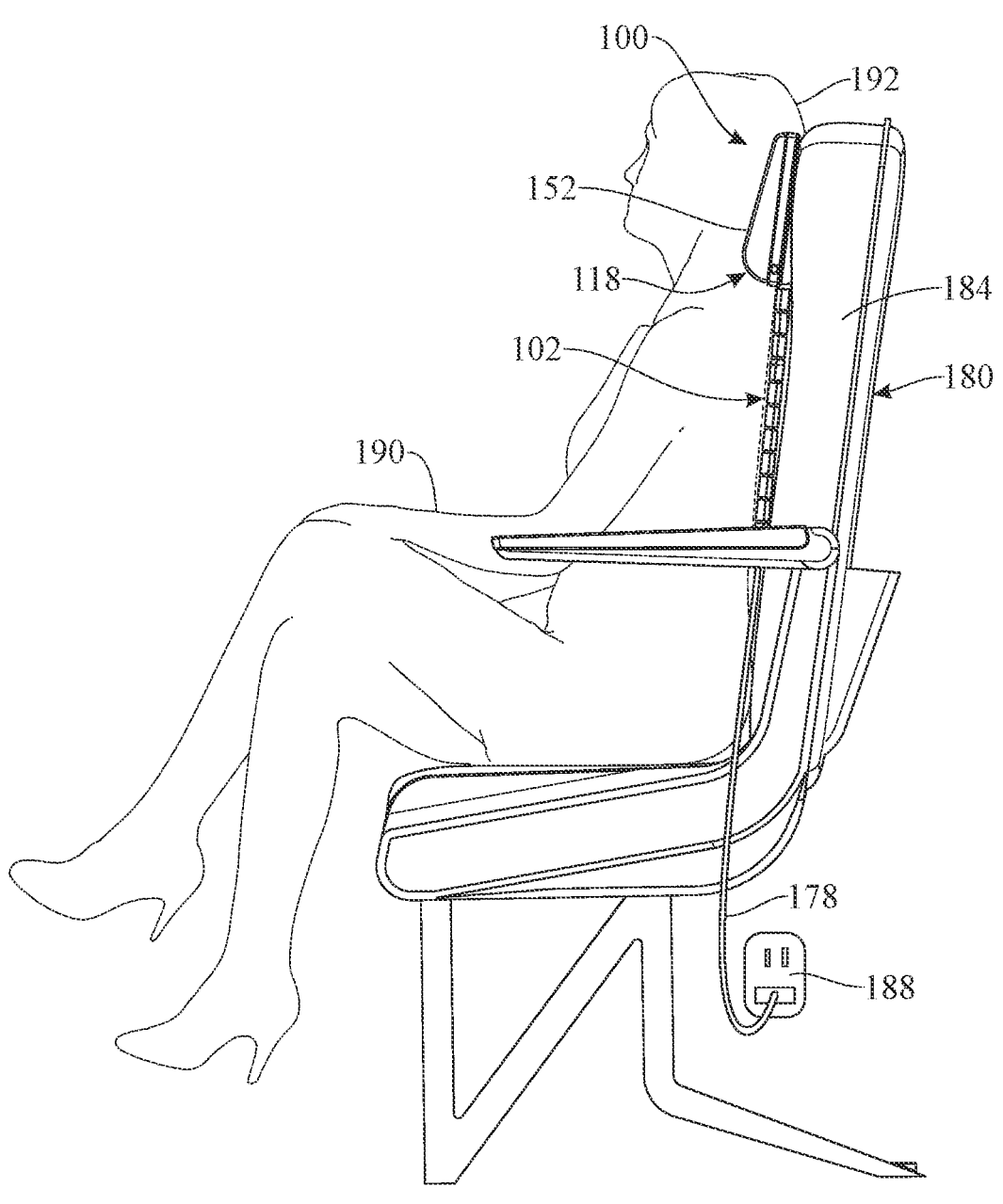
FIG. 5 presents a side view of the ergonomic headrest assembly, deployed in place on the backrest portion of a passenger seat, with a user seated in the passenger seat and the head of the user reclining against the headrest section of the assembly and the side headrest sections of the headrest portion deployed in the straight or coplanar position with respect to the middle headrest section.
Figure 6:
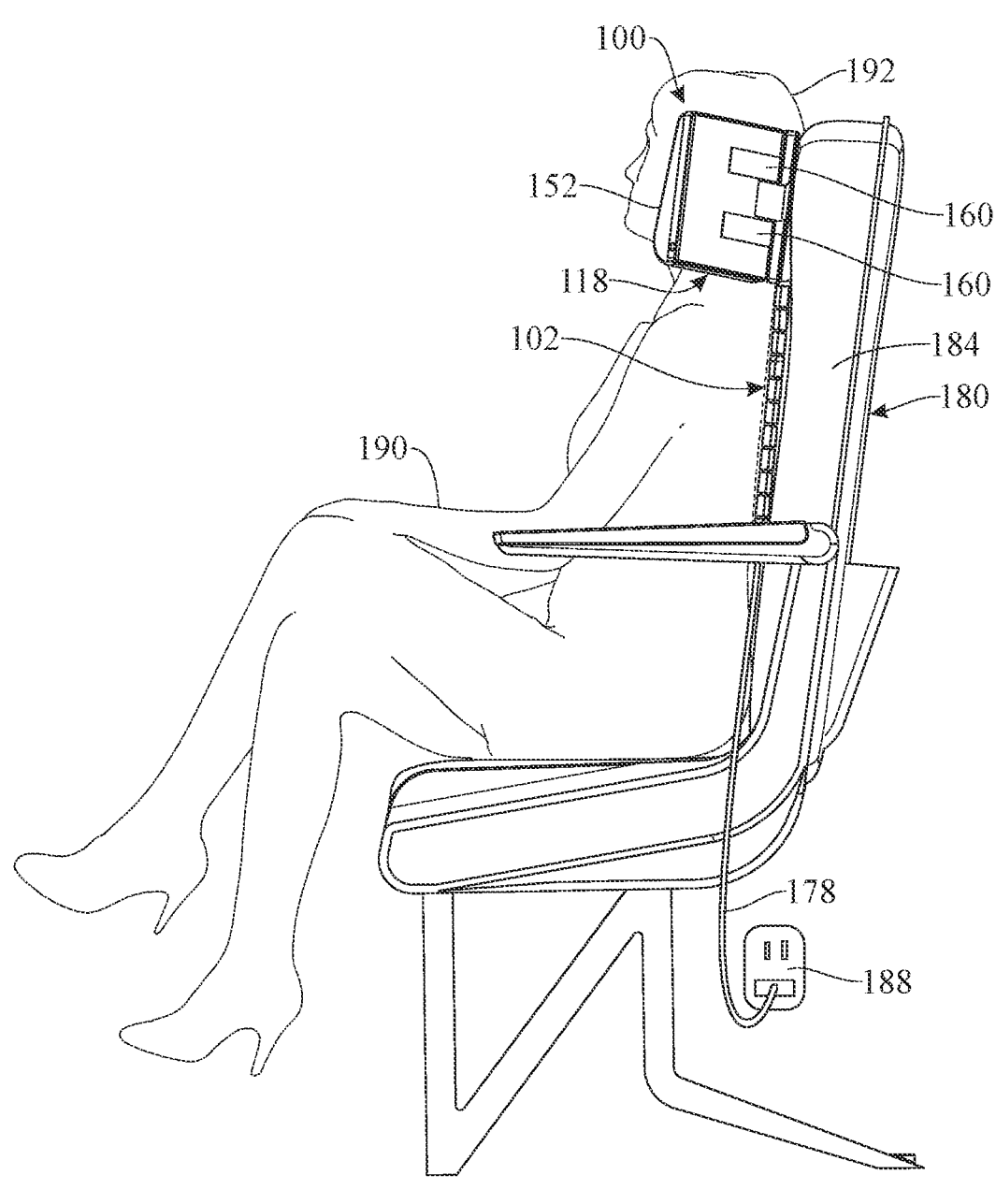
FIG. 6 presents a side view of the ergonomic headrest assembly illustrated in FIG. 5, with the side headrest sections of the headrest portion deployed in the angled position with respect to the middle headrest section.

Referring initially to FIGS. 1-7, an ergonomic headrest assembly 100 is illustrated in accordance with an exemplary embodiment of the present invention. As shown for instance in FIG. 1, the headrest assembly 100 may include a lower portion 102. A headrest portion 118 may be adjoined to the lower portion 102. The headrest portion 118 may include a middle headrest section 120. A pair of side headrest sections 140 may extend from the middle headrest section 120; this pair of side headrest sections operate independently of each other. As illustrated in FIGS. 5 and 6, in typical application, which will be hereinafter described, the headrest assembly 100 may be secured to the backrest portion 184 of a passenger seat 180 in a vehicle to support the head 192 of a user 190 such as a passenger as the user 190 sits in the passenger seat 180. As illustrated in FIGS. 2 and 3, the side headrest sections 140 may be adjustable at selected angles with respect to the middle headrest section 120 to support and prevent or restrict side-to-side movement of the head 192 (FIGS. 5 and 6) of a user 190 as the middle headrest section 120 of the headrest portion 118 supports the user's head 192.

The lower portion 102 of the headrest assembly 100 may be elongated with a bottom end 104 and a top end 106. The headrest portion 118 may be supported by the top end 106 of the lower portion 102. In some embodiments, the lower portion 102 may be relatively narrow, as shown for instance in the drawings, and May serve as a handle or gripping area for a user to grasp and carry the headrest assembly 100. In other embodiments, the lower portion 102 may be wider, such as to extend along a substantial portion (e.g., 50%) of the width of a user's back and increase user comfort. In some embodiments, the lower portion 102 may be relatively short, as shown; alternative embodiments are contemplated, however, in which the length (i.e. distance between the top end 106 and the bottom end 104) of the lower portion 102 may be relatively high, such as to allow the bottom end 104 of the lower portion 102 to be arranged at or below the lumbar area of a user whose head is resting on the headrest portion 118, Furthermore, in different embodiments of the invention, the shape of the lower portion 102 may vary; for example, the lower portion 102 may be relatively flat, with parallel front and rear sides to rest on a user's back and a seat backrest, respectively, as shown in FIG. 5, and/or may have rounded edges to increase user comfort when gripping or resting on the lower portion 102.

In some embodiments, a head portion 110 may terminate the top end 106 of the lower portion 102. The headrest portion 118 may be attached to the head portion 110. In some embodiments, the head portion 110 may be generally wider than the lower portion 102.

As illustrated in FIG. 3, in some embodiments, the lower portion 102 may be deformable such as to conform to a user's back and/or to a seat backrest during operation. In one non-limiting example, the lower portion 102 may include multiple, discrete bodies 114, movably interconnected to one another. For instance, a joint 112 may pivotally or flexibly connect each pair of adjacent discrete bodies 114. The joints 112 may facilitate selective deployment of the lower portion 102 in the elongated, straight configuration illustrated in FIG. 3 and a deformed, non-straight position. In some embodiments, the lower portion 102 may be operable at the joints 112 to a rolled, folded, or otherwise collapsed configuration to reduce the size of the lower portion 102 and facilitate space-efficient storage and carrying of the headrest assembly 100.

As illustrated in FIG. 2, the middle headrest section 120 of the headrest portion 118 may include a middle backing panel 122. A middle headrest cushion 136 may be provided on the middle backing panel 122. At least one headrest section hinge 160 may pivotally connect each side headrest section 140 to the middle backing panel 122 of the middle headrest section 120.

As further illustrated in FIG. 2, each side headrest section 140 of the headrest portion 118 may include a side backing panel 142, A side headrest cushion 152 may be provided on the side backing panel 142. The at least one headrest section hinge 160 may pivotally connect the side backing panel 142 of each side headrest section 140 to the middle backing panel 122 of the middle headrest section 120. Each of the headrest sections operate independently of each other.

In some embodiments, the middle headrest section 120 and each side headrest section 140 of the headrest portion 118 may be generally rectangular. The middle backing panel 122 of the middle headrest section 120 may have a pair of side middle panel edges 128. A lower middle panel edge 124 and an upper middle panel edge 126 may extend between the side middle panel edges 128. The lower middle panel edge 124 on the middle backing panel 122 of the middle headrest section 120 may be attached to the head portion 110 of the lower portion 102.

The middle backing panel 122 of the middle headrest section 120 may additionally have a front middle panel surface 130 and a rear middle panel surface 132. The middle headrest cushion 136 may be attached to the front middle panel surface 130 using adhesive, mechanical fasteners and/or other suitable attachment technique known by those skilled in the art.

The side backing panel 142 of each side headrest section 140 may have an inner side panel edge 148 and an outer side panel edge 150. A lower side panel edge 144 and an upper side panel edge 146 may extend between the inner side panel edge 148 and the outer side panel edge 150. The headrest section hinge 160 may pivotally attach the inner side panel edge 148 on each side backing panel 142 of each corresponding side headrest section 140 to a corresponding one of the side middle panel edges 128 on the middle backing panel 122 of the middle headrest section 120.

The side backing panel 142 of each side headrest section 140 may additionally have a front side panel surface 154 and a rear side panel surface 156. The side headrest cushion 152 may be attached to the front side panel surface 154 using adhesive, mechanical fasteners and/or other suitable attachment technique known by those skilled in the art.

As illustrated in FIGS. 2 and 4, in some embodiments, at least one assembly securing mechanism 164 may facilitate attachment of the headrest portion 118 of the headrest assembly 100 to the backrest portion 184 of the passenger seat 180. The assembly securing mechanism 164 may have any design which is suitable for the purpose. For example, in some embodiments, the assembly securing mechanism 164 may include at least one first attachment strip 166 (FIG. 2) on the headrest portion 118 and at least one second attachment strip 168 (FIG. 4) on the backrest portion 184 of the passenger seat 180, The first attachment strip 166 may be configured to detachably engage the second attachment strip 168 to detachably attach the headrest assembly 100 to the backrest portion 184. As illustrated in FIG. 2, the first attachment strip 166 may be provided on the rear middle panel surface 132 of the middle backing panel 122 and the rear side panel surfaces 156 of the respective side backing panels 142.

Figure 7:
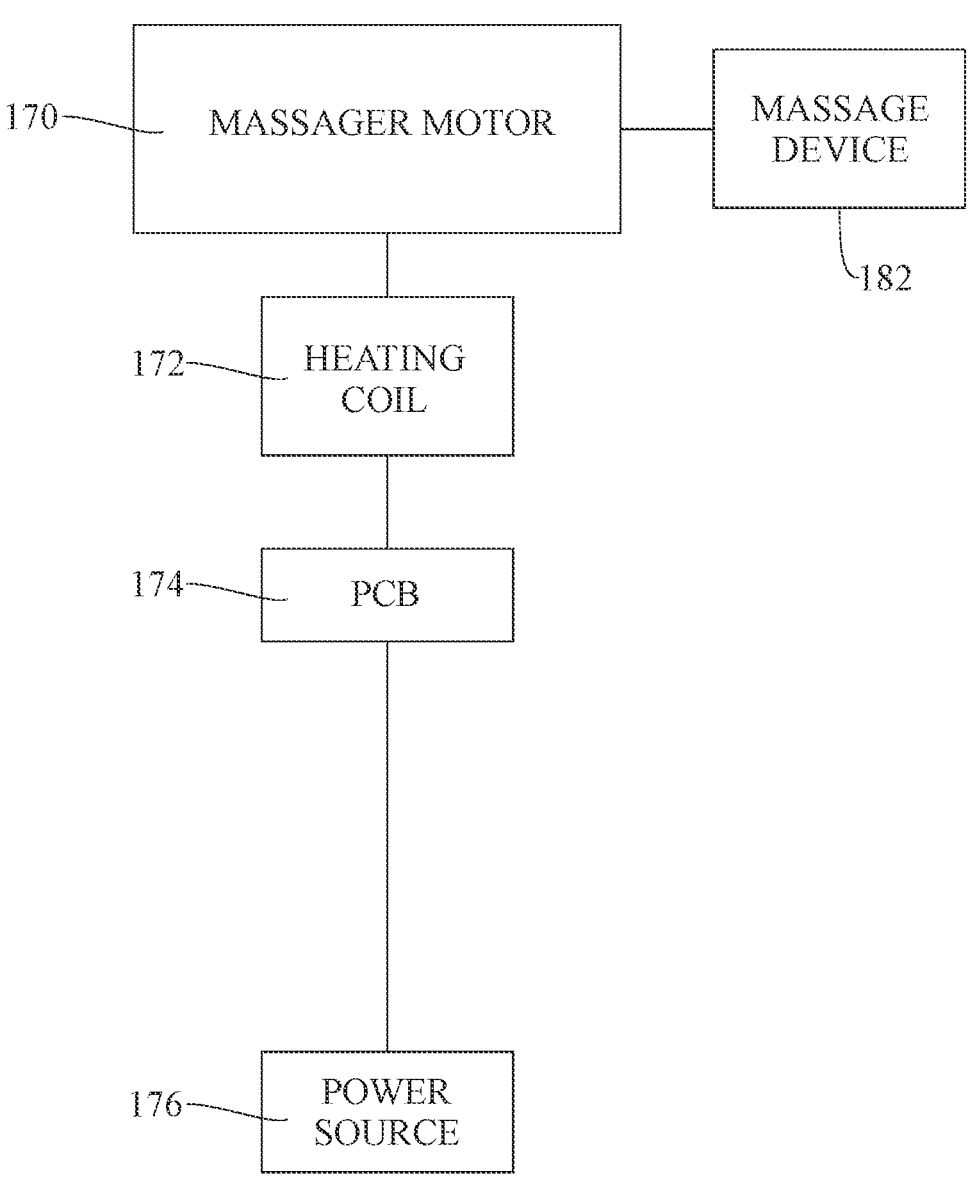
FIG. 7 presents a functional block diagram of a typical massager motor, massage device and heating coil operationally interfacing with a PCB and a power source in accordance with an illustrative embodiment of the present invention.

As illustrated in FIG. 7, in some embodiments, a massage device 182, operably engaged by a massager motor 170, may be disposed in the headrest portion 118 and/or the lower portion 102 of the headrest assembly 100. The massager motor 170 and the massage device 182 may have a standard or conventional design known by those skilled in the art. The massage device 182 may be configured to impart massage movements to the headrest portion 118 and/or the lower portion 102 of the headrest assembly 100. Additionally or alternatively, at least one heating coil 172 may be provided in the headrest portion 118 and/or the lower portion 102. The heating coil 172 may be configured to impart heat to the headrest portion 118 and/or the lower portion 102 according to the knowledge of those skilled in the art. Additionally or alternatively, at least one cooling element (not shown) may be disposed in the headrest portion 118 and/or the lower portion 102 to cool the headrest portion 118 and/or the lower portion 102 according to the knowledge of those skilled in the art.

A control unit, processor unit, or printed circuit board containing a processor unit, hereinafter referred to as PCB (Printed Circuit Board) 174, may controllably interface with the massager motor 170, the heating coil 172, and/or the cooling element. The PCB 174 may be configured to facilitate selective control of the massager motor 170, massage device 182, the heating coil 172, and the cooling element according to the knowledge of those skilled in the art. At least one control feature (not illustrated) such as a switch or button, for example and without limitation, may controllably interface with the PCB 174 for the purpose. The control feature may be provided in any suitable accessible location of the headrest assembly 100, such as, but not limited to, on the lower portion 102 or the headrest portion 118.

As further illustrated in FIG. 7, at least one power source 176 may electrically interface with the massager motor 170, the heating coil 172 and/or the cooling element. In some embodiments, the power source 176 may include an external power source. As illustrated in FIGS. 5 and 6, a power cord 178 may electrically interface with the massager motor 170, the heating coil 172 and/or the cooling element typically through the PCB 174. As illustrated in FIGS. 5 and 6, the power cord 178 may be configured for connection to an external electrical outlet 188. As illustrated in FIG. 2, the power cord 178 may be configured to be folded into a compact storage configuration for storage in the lower portion 102 of the headrest assembly 100 when the massager motor 170, the heating coil 172, and/or the cooling element is not in use. In other embodiments, the power source 176 may include at least one battery which may be rechargeable and/or disposable.

As illustrated in FIGS. 4-6, in typical application, the headrest assembly 100 may be deployed in place on the backrest portion 184 of a passenger seat 180 on an automobile, plane, bus, train or other vehicle. The assembly securing mechanism 164 may be deployed in place to secure the headrest assembly 100 on the backrest portion 184 of the passenger seat 180. A passenger or other user 190 may sit in the passenger seat 180 with his or her back typically reclining against the backrest portion 184. The head 192 of the user 190 may rest against the middle headrest section 120 of the headrest portion 118 of the headrest assembly 100.

The side headrest sections 140 of the headrest portion 118 may be adjusted to the desired angle with respect to the middle headrest section 120 according to the comfort and preferences of the user 190. As illustrated in FIGS. 1 and 5, the side headrest sections 140 may be deployed in a substantially straight or coplanar position with respect to the middle headrest section 120 of the headrest portion 118. Alternatively, as illustrated in FIGS. 2 and 6, the side headrest sections 140 may be adjustable at selected angles with respect to the middle headrest section 120 to support and prevent or restrict side-to-side movement of the head 192 of the user 190 as the middle headrest section 120 supports the user's head 192.

As illustrated in FIGS. 5-7, in some applications, the massager motor 170 and massage device 182 and/or the heating coil 172 (or the cooling element) may be energized to vibrate and/or heat (or cool), respectively, the headrest portion 118 and/or the lower portion 102. In some embodiments, the power cord 178 may be unfolded and extended from the lower portion 102 of the headrest assembly 100 and typically plugged into the external electrical outlet 188. The control feature (not illustrated) on the lower portion 102, headrest portion 118, or other area of the ergonomic headrest assembly 100, may be manipulated to facilitate flow of electrical current from the power source 176 typically through the PCB 174 to the massager motor 170 and/or the heating coil 172 (or the cooling element) for operation thereof.

When use of the headrest assembly 100 is completed, the headrest portion 118 may be detached from the backrest portion 184 of the passenger seat 180. The lower portion 102 may be rolled, folded, or collapsed, and the headrest assembly 100 placed in a bag or luggage (not illustrated) and carried off the vehicle.

It will be appreciated by those skilled in the art that the ergonomic headrest assembly 100 may be beneficial for users who suffer from back pain, lumbar radiculopathy and other spine and nerve compression conditions. The ergonomic headrest assembly 100 may additionally relieve pain or aggravation in the neck and/or back of the user during travel.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

The inventor claims:

1. An ergonomic headrest assembly, which is comprised of:
   a headrest portion,
   wherein the headrest portion is further comprised of a middle headrest section,
   wherein the headrest portion is further comprised of a pair of side headrest sections,
   wherein a cushion is provided on the middle headrest section,
   wherein the cushion in the middle headrest section is removable,
   wherein a pair of cushions are provided on the pair of side headrest sections,
   wherein the pair of cushions on the pair of side headrest section are removable,
   wherein the pair of side headrest sections are joined to the middle headrest section on opposite sides of the middle headrest section,
   a middle backing panel,
   a rear side panel surface,
   a pair of hinges,
   wherein the pair of hinges secure the middle headrest section to the side headrest sections,
   wherein the pair of side headrest sections operate independently from each other,
   wherein the pair of side headrest sections are configured to be adjusted to a specific angle with respect to the middle headrest section,
   wherein the middle headrest section has a top surface and a bottom surface,
   a lower portion,
   wherein the lower portion has a top end and a bottom end,
   wherein the top end of the lower portion is connected to the bottom surface of the middle headrest section,
   wherein the middle headrest section is supported by the top end of the lower portion,
   wherein the lower portion is comprised of a plurality of discrete bodies, the plurality of discrete bodies including at least four rectangular bodies connected end to end and configured to contain a power source,
   wherein a plurality of joints are provided between the plurality of discrete bodies of the lower portion, wherein the plurality of joints allow the plurality of discrete bodies to be rolled,
   wherein the lower portion is configured to be detached from the middle headrest section,
   an assembly securing mechanism,
   wherein the assembly securing mechanism is further comprised of a first attachment strip and a second attachment strip,
   wherein the first attachment strip is affixed to the back surface of the middle headrest section and a portion of the adjoining pair of side headrest sections,
   wherein the second attachment strip is affixed to a chair,
   wherein the ergonomic headrest assembly is attached to the chair with the first and second attachment strips.

2. The ergonomic headrest assembly as described in claim 1 wherein the width of the discrete bodies of the lower portion are longer along a horizontal direction.

3. The ergonomic headrest assembly as described in claim 1 wherein the width of the discrete bodies of the lower portion are rounded.

4. An ergonomic headrest assembly, which is comprised of:
   a headrest portion,
   wherein the headrest portion is further comprised of a middle headrest section,
   wherein the headrest portion is further comprised of a pair of side headrest sections,
   wherein a cushion is provided on the middle headrest section,
   wherein the cushion in the middle headrest section is removable,
   wherein a pair of cushions are provided on the pair of side headrest sections,
   wherein the pair of cushions on the pair of side headrest section are removable,
   wherein the pair of side headrest sections are joined to the middle headrest section on opposite sides of the middle headrest section,
   a middle backing panel,
   a rear side panel surface,
   a pair of hinges,
   wherein the pair of hinges secure the middle headrest section to the side headrest sections,
   wherein the pair of side headrest sections operate independently from each other,
   wherein the pair of side headrest sections are configured to be adjusted to a specific angle with respect to the middle headrest section,
   wherein the middle headrest section has a top surface and a bottom surface,
   a lower portion,
   wherein the lower portion has a top end and a bottom end,
   wherein the top end of the lower portion is connected to the bottom surface of the middle headrest section,
   wherein the middle headrest section is supported by the top end of the lower portion,
   wherein the lower portion is comprised of a plurality of discrete bodies, the plurality of discrete bodies including at least four rectangular bodies connected end to end and configured to contain a power source,
   wherein a plurality of joints are provided between the discrete bodies of the lower portion,
   wherein the plurality of joints allow the plurality of discrete bodies to be rolled,
   wherein the lower portion is configured to be detached from the middle headrest section,
   an assembly securing mechanism, wherein the assembly securing mechanism is further comprised of a first attachment strip and a second attachment strip, wherein the first attachment strip is affixed to the back surface of the middle headrest section and the adjoining pair of side headrest sections, wherein the second attachment strip is affixed to a chair, wherein the ergonomic headrest assembly is attached to the chair with the first and second attachment strips, a control unit, a massage device, wherein the massage device is further comprised of a massage motor, wherein the massage device provides massage movements to the middle headrest section, wherein the massage device provides massage movements to the lower portion of the headrest assembly, a heating coil, wherein the heating coil provides heat to the middle headrest section, wherein the heating coil provides heat to the lower portion, a cooling element, wherein the cooling element is provided in the middle headrest section, wherein the cooling element provides cooling in the lower portion, wherein the control unit interfaces with the massage motor, wherein the control unit interfaces with the heating coil, wherein the control unit interfaces with the cooling element, wherein the power source interfaces with the massage motor, wherein the power source interfaces with the heating coil, wherein the power source is an external power source.

5. The ergonomic headrest assembly as described in claim 4 wherein the width of the discrete bodies of the lower portion are longer along a horizontal direction.

6. The ergonomic headrest assembly as described in claim 4 wherein the width of the discrete bodies of the lower portion are rounded.

7. The ergonomic headrest assembly as claimed in claim 4 wherein each of the side headrest sections is detachable from the middle headrest section.

8. The ergonomic headrest assembly as claimed in claim 4 wherein the lower portion is detachable from the top middle headrest portion.

9. The ergonomic headrest assembly as described in claim 4 wherein the external power source is a battery.

* * * * *